Figure 1:
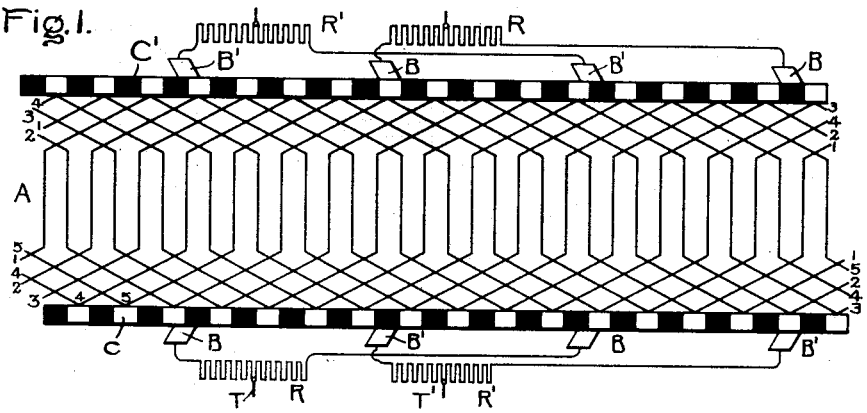

No. 811,304. PATENTED JAN. 30, 1906.
M. C. A. LATOUR.
ALTERNATING CURRENT MACHINE.
APPLICATION FILED JUNE 25, 1904.

Witnesses
J. Ellis Glen.
Allen Oxford

Inventor
MARIUS CHARLES ARTHUR LATOUR.
By Albert G. Davis
Atty.

UNITED STATES PATENT OFFICE.

MARIUS CHARLES ARTHUR LATOUR, OF PARIS, FRANCE, ASSIGNOR TO GENERAL ELECTRIC COMPANY, A CORPORATION OF NEW YORK.

ALTERNATING-CURRENT MACHINE.

No. 811,304.  Specification of Letters Patent.  Patented Jan. 30, 1906.

Application filed June 25, 1904. Serial No. 214,093.

*To all whom it may concern:*

Be it known that I, MARIUS CHARLES ARTHUR LATOUR, a citizen of France, residing at Paris, France, have invented certain new and useful Improvements in Alternating-Current Machines, of which the following is a specification.

My invention relates to alternating-current machines of the commutator type; and its object is to provide novel commutating means for such machines, whereby sparking at the commutator is eliminated.

Commutation in alternating-current machines presents difficulties which are absent in direct-current machines, since in an alternating-current machine the coil which is short-circuited at the instant of commutation is subject to an alternating or pulsating field. Various methods of reducing sparking have been devised; but by my invention I remove the cause of the sparking, since I so arrange the commutator-brushes that no coils are short-circuited within the machine during commutation, and, furthermore, I do not accomplish this end by open-circuiting the armature, as has been done in some of the arrangements proposed heretofore.

It is a well-known characteristic of the series or wave winding that only a single pair of brushes are required for a multipolar machine, since all of the armature-winding is in series. I take advantage of this fact by providing a commutator having alternate live and dead segments and employing a plurality of brushes of each polarity distributed around the commutator of a width no greater than that of a commutator-segment. If only a single pair of brushes were used, the armature-circuit would be opened every time a dead segment passed a brush; but by employing a second set of brushes connected in parallel with the first and so arranging the second set that they are in engagement with live segments at the instant that the first set are in engagement with dead segments I maintain the armature-circuit always closed, although the circuit of each brush is continually opened and closed.

With the arrangement as outlined above it is evident that no short circuit can be produced by a single brush, since no single brush is wide enough to engage two live segments at the same time. Consequently no short circuits can exist within the machine. The only short circuits that can exist are between the parallel-connected brushes of the same polarity, and since this connection is outside of the machine not only may a resistance be inserted in the connection to limit the flow of current, but also the amount of resistance may readily be controlled. The latter point is especially important in the case of alternating-current motors, since at starting the induced electromotive force in the short-circuited armature-coils is large, while at synchronism it is small. Consequently if sufficient resistance be inserted in the commutator-leads, as has been proposed heretofore, to limit properly the short-circuited current at starting a great deal of power would be wasted when the motor is operating near synchronism. By means of my invention the motor may be started with sufficient resistance between the parallel-connected brushes to limit the short-circuited current to any desired amount, and this resistance may be cut out as the motor comes up to speed.

My invention also comprises as a further feature the combination, with an alternating-current machine, of two commutators of the type described above connected to opposite ends of the armature-conductors, a plurality of brushes bearing on each commutator, and resistances connecting brushes of the same polarity. The use of the additional commutator decreases current fluctuation in the armature and improves the efficiency and operation of the motor. In this aspect my invention is not limited to a multipolar machine or to a wave-wound armature, since by the use of two commutators a plurality of brushes of each polarity may be employed, even in a bipolar machine.

My invention will best be understood from the accompanying drawings, in which—

Figure 2:
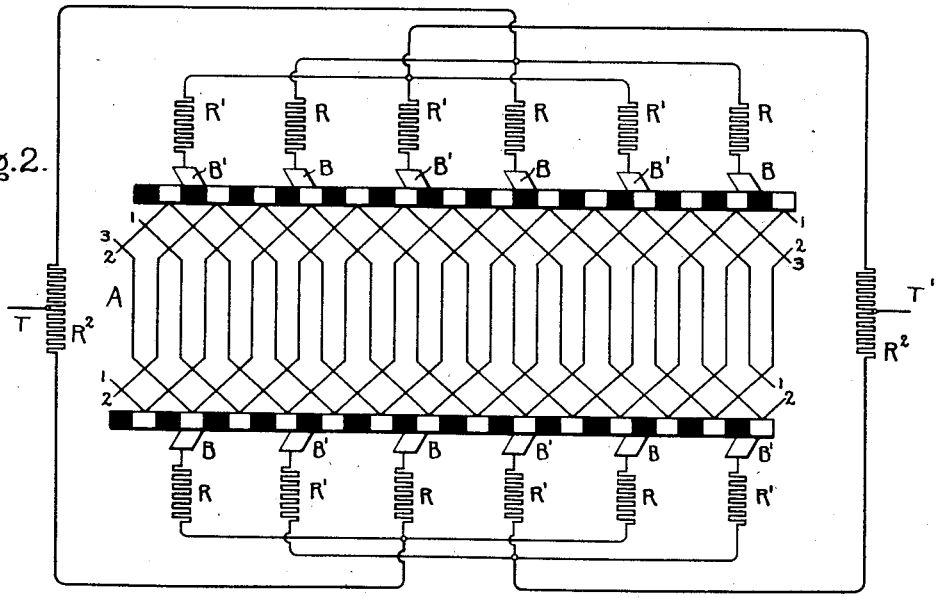
Figure 3:
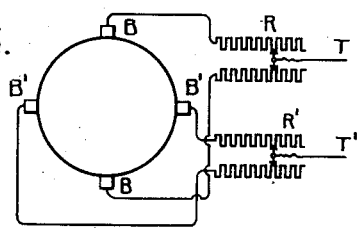
Figure 4:
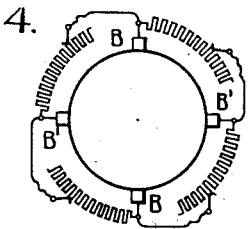

Figure 1 shows diagrammatically a four-pole series or wave winding provided with a commutator and brushes in accordance with my invention. Fig. 2 shows a six-pole series winding similarly provided. Fig. 3 shows diagrammatically an arrangement for cutting out the resistance between parallel-connected brushes, and Fig. 4 shows a different connection of the resistances adapted for a repulsion-motor.

In Fig. 1, A represents the armature-winding, which is shown as the well-known series or wave winding developed on a plane surface. The commutator C is provided with alternate conducting-segments connected to the winding and dead segments disposed between the conducting or live segments. The dead segments may be made of insulating material, as shown, or may be composed of conducting material simply insulated from the live segments. Four brushes are shown bearing on the commutator C, the brushes of the same polarity being indicated by the same letters. Thus B B represent brushes of one polarity, and B' B' brushes of the opposite polarity. If the brushes are symmetrically distributed around the commutator, as shown, the commutator is arranged with an odd number of conducting-segments, so that when one brush is on a live segment the other brush of the same polarity is on a dead segment. The brushes of the same polarity are connected through a resistance designed to limit properly the amount of short-circuited current. Thus the brushes B B are connected by a resistance R, a tap T from the center of the resistance forming one terminal of the armature. The brushes of opposite polarity B' B' are similarly connected through resistance R'. Although one commutator, as described, is sufficient for the purpose of my invention, I have shown in Fig. 1 a second commutator C' for a reason that will be explained later.

In Fig. 2 I have shown my invention similarly applied to the six-pole winding. With this arrangement six sets of brushes are used, three of the brushes B B B being of one polarity and the other brushes being of the opposite polarity. The brushes B B B are connected through the resistances R R R, and brushes B' B' B' are similarly connected through the resistances R' R' R'. The operation with both of these windings is the same as has been heretofore described. The current is shifted from one brush to another brush of the same polarity and back again as a dead segment passes first one brush and then the other. No short circuits exist within the machine, and the circuit of the armature-winding is never opened, although the circuits of the several brushes are continually opened in succession.

In order to reduce any fluctuations which may result from shifting the current from one brush to another, two commutators may be employed, as shown in the figures, and all the positive brushes may be connected together, as shown in Fig. 2, in which the positive brushes bearing on one commutator are connected to those bearing on the other commutator through the resistances R². These resistances merely supplement the resistances R and R' and may be omitted entirely.

As has been said heretofore, since the resistance is external to the machine the amount of resistance in the short-circuiting connection may be varied, as desired, to meet varying conditions of operation. Thus in Fig. 3 the resistance R, connecting brushes B B, is shown arranged to be varied, the terminals T T' always being connected to the central point on the resistance. The terminals T T' represent the terminals of the armature-winding, and the arrangement shown is adapted for improving the commutation of any variable-speed machine of the commutator type—as, for instance, an alternating-current series motor. In the special case of a repulsion-motor the terminals T T' would be connected, the operation being the same as already described. Another method of connecting the brushes through resistances is shown in Fig. 4. This connection, which is suited for a repulsion-motor, places all the brushes in a closed circuit, with variable resistances for limiting the amount of current-flow in the armature-circuits. As resistances are cut out the four brushes are short-circuited directly on each other.

What I claim as new, and desire to secure by Letters Patent of the United States, is—

1. In an alternating-current machine, a multipolar field-magnet, a wave-armature winding, a commutator composed of alternate live and dead segments, and a plurality of brushes of each polarity distributed around said commutator, the width of a brush being not greater than that of a segment.

2. In an alternating-current machine, a multipolar field-magnet, a wave-armature winding, a commutator composed of alternate live and dead segments, a plurality of brushes of each polarity distributed around said commutator, the width of a brush being not greater than that of a segment, and resistances connecting brushes of like polarity.

3. In an alternating-current machine, a multipolar field-magnet, a wave-armature winding, a commutator composed of alternate live and dead segments, a plurality of brushes of each polarity distributed around said commutator, the width of a brush being not greater than that of a segment, resistances connecting brushes of like polarity, and means for varying the amount of said resistance.

4. In an alternating-current motor, a multipolar field-magnet, a wave-armature winding, a commutator composed of alternate live and dead segments, a plurality of brushes of each polarity distributed around said commutator, the width of a brush being not greater than that of a segment, resistances connecting brushes of like polarity, and means for cutting out said resistances when the motor comes up to speed.

5. In an alternating-current machine, a multipolar field-magnet, a wave-armature winding, a commutator therefor having alternate live and dead segments, a plurality of brushes of each polarity distributed around said commutator, said brushes being so arranged that one brush is on a live segment when another brush of the same polarity is on a dead segment.

6. In an alternating-current machine, a multipolar field-magnet, a wave-armature winding, a commutator therefor having alternate live and dead segments, a plurality of brushes of each polarity distributed around said commutator, the width of a brush being not greater than that of a segment and said brushes being so arranged that one brush is on a live segment when another brush of the same polarity is on a dead segment, and resistances connecting brushes of the same polarity.

7. In an alternating-current machine, two commutators connected to opposite ends of the armature-conductors, each commutator having alternate live and dead segments, brushes bearing on said commutators, and resistances connecting brushes of the same polarity on opposite commutators.

8. In an alternating-current machine, a multipolar field-magnet, a wave-armature winding, two commutators connected to opposite ends of the armature-conductors, each commutator having alternate live and dead segments, a plurality of brushes of each polarity distributed around each commutator, the width of a brush being not greater than that of a segment and the brushes being so arranged that when one brush is on a dead segment other brushes of the same polarity are on live segments, and resistances interconnecting the brushes of the same polarity.

In witness whereof I have hereunto set my hand this 24th day of June, 1904.

MARIUS CHARLES ARTHUR LATOUR.

Witnesses:
   EDWARD WILLIAMS, Jr.,
   L. A. HAWKINS.